US011930913B2

(12) United States Patent
Knoblauch

(10) Patent No.: US 11,930,913 B2
(45) Date of Patent: Mar. 19, 2024

(54) HOLDER AND HOLDER SUPPORT SYSTEM

(71) Applicant: Home Equity Renovations and Design Inc., Bensalem, PA (US)

(72) Inventor: Douglas Raymond Knoblauch, Newtown, PA (US)

(73) Assignee: Home Equity Renovations And Design Inc., Bensalem, PA (US)

( * ) Notice: Subject to any disclaimer, the term of this patent is extended or adjusted under 35 U.S.C. 154(b) by 0 days.

(21) Appl. No.: 17/855,946

(22) Filed: Jul. 1, 2022

(65) Prior Publication Data

US 2022/0338613 A1 Oct. 27, 2022

Related U.S. Application Data

(63) Continuation of application No. 17/000,656, filed on Aug. 24, 2020, now Pat. No. 11,395,537.

(60) Provisional application No. 63/100,025, filed on Feb. 25, 2020, provisional application No. 62/922,726, filed on Aug. 26, 2019.

(51) Int. Cl.
*A45F 5/02* (2006.01)
*B25H 3/02* (2006.01)

(52) U.S. Cl.
CPC ............. *A45F 5/021* (2013.01); *B25H 3/022* (2013.01); *A45F 2200/0575* (2013.01)

(58) Field of Classification Search
CPC .... A45F 5/021; A45F 2200/0575; A45F 3/14; A45F 2003/146; B25H 3/022; B25H 3/00
See application file for complete search history.

(56) References Cited

U.S. PATENT DOCUMENTS

| | | | | | |
|---|---|---|---|---|---|
| 1,625,920 | A * | 4/1927 | Thurman | A45C 5/00 | 224/241 |
| 1,806,477 | A * | 5/1931 | Lloyd | A01K 97/04 | 224/679 |
| 4,106,679 | A * | 8/1978 | Hillinger | B25H 3/00 | 224/197 |
| 5,337,760 | A * | 8/1994 | Nichols | A61B 6/0421 | 5/637 |
| 5,397,040 | A * | 3/1995 | Lee | A01K 97/06 | 224/240 |
| 5,445,303 | A | 8/1995 | Cawile, Jr. | | |
| 5,609,283 | A * | 3/1997 | Harrison, Jr. | A45F 5/02 | 224/678 |
| 5,695,104 | A | 12/1997 | Darling | | |

(Continued)

OTHER PUBLICATIONS

U.S. Appl. No. 62/922,726, filed Aug. 26, 2019.

(Continued)

*Primary Examiner* — David M Upchurch

(74) *Attorney, Agent, or Firm* — Craig R. Miles; CR MILES P.C.

(57) ABSTRACT

A belt mountable holder and methods of making and using a belt mountable holder including an arcuate member suspendable from a belt disposed about the waist of a wearer and having mateable fasteners disposed on an exterior face of the arcuate member to releasably couple one or more containers to carry articles or tool retainers to retain tools and optionally including a holder support to transfer a holder weight normally applied to the waist of a wearer to a ground engaging surface to remove weight bearing stress from the wearer's waist.

13 Claims, 16 Drawing Sheets

(56) References Cited

U.S. PATENT DOCUMENTS

| | | | | |
|---|---|---|---|---|
| 5,842,620 | A * | 12/1998 | Koudakis | A45F 5/02 224/678 |
| 5,915,610 | A * | 6/1999 | Russell | A45F 5/02 224/904 |
| 6,149,042 | A * | 11/2000 | Rassias | A45F 5/00 224/907 |
| 6,209,769 | B1 * | 4/2001 | Seals | A45C 1/04 224/675 |
| 6,293,445 | B1 * | 9/2001 | Miller | A45F 5/021 224/679 |
| D473,048 | S * | 4/2003 | DiLorenzo | D3/226 |
| 6,547,118 | B2 * | 4/2003 | Beletsky | A45F 5/00 224/684 |
| 6,604,659 | B1 * | 8/2003 | Graves | B25H 3/00 224/232 |
| D481,534 | S * | 11/2003 | Andrew | D3/226 |
| 6,662,985 | B2 * | 12/2003 | Harada | A45F 5/021 224/904 |
| 6,685,066 | B2 * | 2/2004 | Cragg | F41C 33/0218 224/198 |
| 7,331,872 | B1 * | 2/2008 | Parsons | A45F 5/02 224/195 |
| D720,529 | S * | 1/2015 | Hintze | D3/228 |
| 8,991,672 | B2 * | 3/2015 | Hassler | B25H 3/00 224/663 |
| 9,924,784 | B1 * | 3/2018 | Loso | A45F 5/021 |
| 10,420,414 | B1 * | 9/2019 | Snyder | A45F 3/14 |
| 2002/0020000 | A1 | 2/2002 | Garcia | |
| 2003/0111497 | A1 | 6/2003 | Lukaris | |
| 2008/0302845 | A1 * | 12/2008 | Blechman | B25H 3/006 224/678 |
| 2012/0168472 | A1 * | 7/2012 | Mathews | A45F 5/021 224/162 |
| 2015/0351571 | A1 * | 12/2015 | Johnson | A45F 5/00 220/737 |
| 2017/0065066 | A1 | 3/2017 | Hintze | |
| 2017/0182652 | A1 | 6/2017 | Martinez et al. | |
| 2019/0090716 | A1 * | 3/2019 | Martinez | A47L 1/06 |

OTHER PUBLICATIONS

U.S. Appl. No. 63/100,025, filed Feb. 25, 2020.

PCT International Patent Application No. PCT/US20/47752; International Search Report and Written Opinion of the International Searching Authority dated Nov. 23, 2020, 11 pages.

U.S. Appl. No. 17/000,656, filed Aug. 24, 2020.

U.S. Appl. No. 17/000,656, Office Action dated Mar. 1, 2022.

Home Depot. ToughBuilt Handyman 16 in. 27-Pockents Tool Belt Set in Black (3-Piece). Website, https://www.homedepot.com, originally downloaded Aug. 3, 2020, 5 pages.

* cited by examiner

HOLDER AND HOLDER SUPPORT SYSTEM

I. FIELD OF THE INVENTION

A belt mountable holder and methods of making and using a belt mountable holder including an arcuate member suspendable from a belt disposed about the waist of a wearer and having mateable fasteners disposed on an exterior face of the arcuate member to releasably couple one or more containers to carry articles or tool retainers to retain tools and optionally including a holder support to transfer a holder weight normally applied to the waist of a wearer to a ground engaging surface to remove weight bearing stress from the wearer's waist.

II. SUMMARY OF THE INVENTION

A broad object of embodiments of the invention can be to provide a holder including one or more of an arcuate member having opposite arcuate member interior and exterior faces bounded by an upper edge, a lower edge, a first side edge, and a second side edge, the arcuate member interior face defining an arcuate member arc between the first and second side edges and a belt receiving element disposed on the interior surface of the arcuate member, the belt receiving element configured to provide a passage in which a belt can reside to support the holder about a waist of a wearer, and a first of a mateable pair of fasteners coupled to the exterior face of the arcuate member and a second of the mateable pair of fasters coupled to the arcuate back panel of one or more containers or coupled to one or more tool holders, to allow releasable mateable fastening of the one or more containers or the one or more tool holders on the exterior face of the arcuate member.

Another broad object of embodiments of the invention can be to provide a holder support which transfers a holder weight normally applied to the waist of the wearer to a ground engaging surface to remove weight bearing stress from the waist of the wearer, the holder support including one or more of an outsole including a ground engaging surface opposite a foot engaging surface adapted to engage a foot of the wearer, a stirrup including a stirrup base coupled to the outsole with a stirrup side piece upwardly extending to terminating in a stirrup end, a first support member having a length disposed between a first support member first end and a first support member second end, the first support member first end pivotally coupled to the stirrup end, the first support member configured to extend upwardly to positions adjacent an outer side of a calf of the wearer, a second support member having a length disposed between a second support member first end and a second support member second end, the second support member first end pivotally coupled to the first support member second end at a position adjacent an outer side of a knee of the wearer; and a third support member having a length disposed between third support member first end and a third support member second end, the third support member first end pivotally coupled to the second support member second end adjacent an outer side of a hip of the wearer, the third support member second end affixed to the holder. Optionally, a first height adjustment assembly can be medially disposed in the first support member permitting relative motion between said first support member first and second ends and a first motion arrest assembly which arrests relative motion between said first support member first and second ends, a second height adjustment assembly medially disposed in said second support member permitting relative motion between second support member first and second ends and a second motion arrest assembly which arrests relative motion between said second support member first and second ends, wherein the first and second motion arrest assemblies being shiftable into and out of a locked configuration to substantially stop relative motion between said first or second support member first and second ends, and an energy absorbing member disposed between the first support member first end and the stirrup end, the energy absorbing member adapted to absorb forces between said stirrup and said first support member.

Naturally, further objects of the invention are disclosed throughout other areas of the specification, drawings, photographs, and claims.

III. BRIEF DESCRIPTION OF THE DRAWINGS

IV. DETAILED DESCRIPTION OF THE INVENTION

Figure 1:
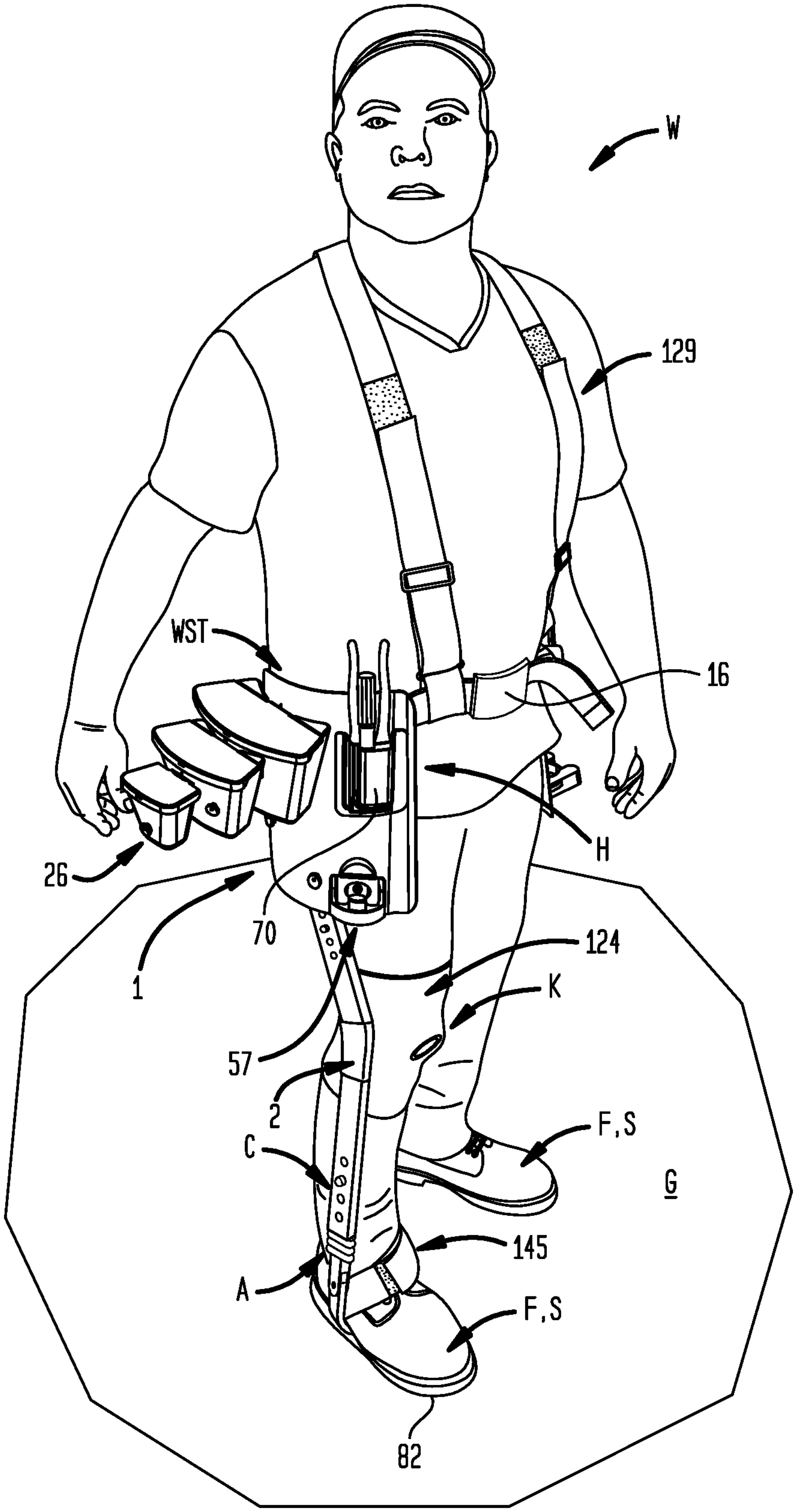
FIG. 1 is an illustration of a particular embodiment of a holder and holder support and method of using the holder and holder support worn by a wearer to hold tools and materials.

Generally, referring to FIGS. 1 through 17, embodiments of a belt mountable holder (1)(also referred to as the "holder") and a holder support (2) which allows containers (3) or tools (4) to be suspended proximate a waist (WST) of a wearer (W) and methods of making and using a holder (1) and a holder support (2) for suspending containers (3) or tools (4) proximate the waist (WST) of the wearer (W).

Now, with primary reference to FIGS. 1 through 14, embodiments of the holder (1) can comprise or consist of one or more of an arcuate member (3) having opposite arcuate member interior and exterior faces (4)(5) bounded by an upper edge (6), a lower edge (7), a first side edge (8), and a second side edge (9). The arcuate member (3) interior and exterior faces (4)(5) define an arcuate member arc (10) between the first and second side edges (8)(9) (as shown in the example of FIG. 6). The term "arc" for the purposes of this invention means a part of a circumference of a circle or other curve defined by the curvature of the arcuate member (3) structure. In particular embodiments, the arcuate member arc (10) between the first and second side edges (8)(9) can have a radius in the range of about four inches to about 6 inches; although depending on the stature of the wearer (W), the radius (R) of the arc (10) can, but need not necessarily, be a radius of greater or lesser inches, or may increase approaching the upper edge (6). The arcuate member (3) can be fabricated or formed from a rigid sheet material (11). The rigid sheet material (11) can have a thickness in the range of about one-eighth inch to about one-quarter inch; although particular embodiments may employ sheet materials (11) having a greater or lesser thickness. The rigid sheet material (11) can comprise a metal or a plastic, and combinations thereof. As illustrative examples, the rigid sheet material (11) can comprise or consist of: aluminum, magnesium, beryllium, and combinations or alloys thereof, or comprise or consist of acrylonitrile butadiene styrene, polycarbonate, polydicyclopentadiene, nylon, and combinations thereof. In particular embodiments as shown in the illustrative examples of FIGS. 1 through 11, the arcuate member perimeter (12) can, but need not necessarily, generally define an arcuate rectangle having rounded corners; however, the illustrative examples shown in the Figures are not intended to preclude embodiments which may include an arcuate member perimeter (12) defining other configurations which can aid in movement of the wearer (W) such as: a trapezoid, a semicircle, an oval, or a truncated triangle.

Now, with primary reference to FIGS. 1 through 11, in particular embodiments, the arcuate member (3) can include an arcuate first side edge margin (13) communicating between the lower edge (7) and the upper edge (6) of the arcuate member (3). The arcuate first side margin (13) can have margin arc (14) extending in opposite direction of the arcuate member arc (10) of the arcuate member interior face (4) (as shown in the example of FIG. 6). The first side edge margin arc (14) can define a radius which avoids or reduces engagement with the wearer (W) with the arcuate member first side edge (8) and the first side edge margin arc (14) can occur in the range of about one-quarter of an inch to about one inch; however, this is not intended to preclude embodiments which have a greater or lesser radius of the first side edge margin arc (14).

Now, with primary reference to FIGS. 1 through 6, embodiments of the holder (1) can further include belt receiving element (15) configured to allow the arcuate member (3) to be suspended from or carried by a belt (16) which may be worn about the waist (WST) of the wearer (W). In the embodiments shown in the Figures, the belt receiving element (15) comprises a channel member (17) having a pair of channel legs (18)(19) outwardly extending from a channel base (20) and joined to the interior face (4) of the arcuate member (3) whereby the channel member (17) defines a passage (21) between opposite open channel ends (22)(23) of the channel member (17) to allow a belt (16) to pass through the passage (21) of the channel member (17). The belt (16) drawn through the passage (21) of the channel member (17) can be disposed about the waist (WST) of the wearer (W) to allow the arcuate member (3) to be suspended from or carried by the belt (16) proximate the waist (WST) of the wearer (W). The belt receiving element (15) can be differently configured depending on the application as a channel, a loop or a clip to provide the passage (21) to receive the belt (16). In particular embodiments, the belt receiving element (15) can be formed from a rigid sheet material (11), such as metal or plastic, as above described. In particular embodiments, the arcuate member (3) and the belt (16) can be inseparably affixed as one-piece. The belt (16) can comprise any one or a combination of materials, such as metal, plastic, leather, or woven synthetic or non-synthetic fibers. In particular embodiments, the belt (16) can comprise a flexible plastic band having releasable mateable belt ends (24)(25). As one illustrative example, a belt first end (24) can have spaced apart teeth which can be drawn through a belt second end (25) having a locking buckle with pawls that by ratchet mechanical action adjust and secure the belt (16) to the waist (WST) of the wearer (W). As second illustrative example, the belt (16) can have overlapping belt first and second ends (24)(25) having releasable mateable hook and loop materials. These illustrative examples are not intended to preclude embodiments which utilize conventional belts (16) with buckles which fastenable about the waist (WST) of the wearer (W).

Now, referring primarily to FIGS. 1 thorough 2, a plurality of belt mountable holders (1) can be separably or inseparably mounted to the belt (16). As shown in the example of FIG. 1 a pair of holders (1A)(1B) can be received or mounted to the belt (16) adjacent opposite hips (H1)(H2) of the wearer (W); however, this is not intended to preclude embodiments in which one, two, three holders, or other plurality of holders (1) are received on or mounted to the belt (16).

Now, referring primarily to FIGS. 5 through 12, embodiments of the invention can further include one or more containers (26) which releasably affix to the exterior face (5) of the arcuate member (3). In particular embodiments, the container (26) can have an arcuate back panel (27) defining a back-panel arc (28) between opposite side panels (29)(30). The container (26) upon being affixed to the exterior face (5) of the arcuate member (3) disposes the arcuate back panel (27) in general parallel relation to the exterior face (5) of the arcuate member (3). In particular embodiments, the container (26) can further include a front panel (31) joined by the opposite side panels (29)(30) and a bottom panel (32) to the arcuate back panel (27) to define a container interior space (33). The front panel (31), opposite side panels (29)(30), and the bottom panel (32) can, but need not necessarily, be made of a rigid material (11) as above described, or can be made from a pliable material such as woven material (whether of natural or synthetic fibers), perforate sheet, leather, or combinations of rigid materials or combinations of pliable materials or combinations of rigid and pliable materials. In particular embodiments, the container (26) can further include a top cover (34) having a top attachment portion (35) interconnecting the top cover (34) to the arcuate back panel (27). The illustrative example of FIG. 5, includes a hinge (36) interposed between the top cover (34) and the arcuate back panel (27) to allow the top cover (34) to rotate between a closed condition (36) and an open condition (37). In particular embodiments, a torsion spring (38) biasedly disposed about a hinge shaft (39) has first and second torsion spring ends (40)(41) biasing against the arcuate back plate (27) and the cover top (34) respectively providing torsion force (F) to urge the top cover (34) toward the open condition (37). The container (26) can be utilized to contain within the interior space (33) a wide variety of tools (42) such as: tape measures, bubble levels, screw drivers, pressure gauges; materials such as: solids, pastes, gels; liquids, such as: adhesives, lubricants, solvents, fuels, primer, paint; fasteners (42') used for mechanical joining of materials such as: nails, screws, set screws, bolts and nuts, pins and rivets, crimps, snap-fits, shrink fits, clamps, clasps, clips, grommets, latches, pegs, pins, bands, ties, tags, twist ties, zip ties, zippers, and combinations thereof; however, these illustrative examples do not preclude utilization of the container (26) to hold any manner of objects or materials. In particular embodiments, the containers (26) can contain any of various retail products such as small tools, fasteners, materials, or otherwise, which can be distributed by retailers allowing the wearer (W) of the belt mounted holder (1) to purchase the containers (26) already filled with the tools, fasteners, materials, or other objects, which can be releasably affixed to the exterior face (5) of the arcuate member (3).

Figure 5:
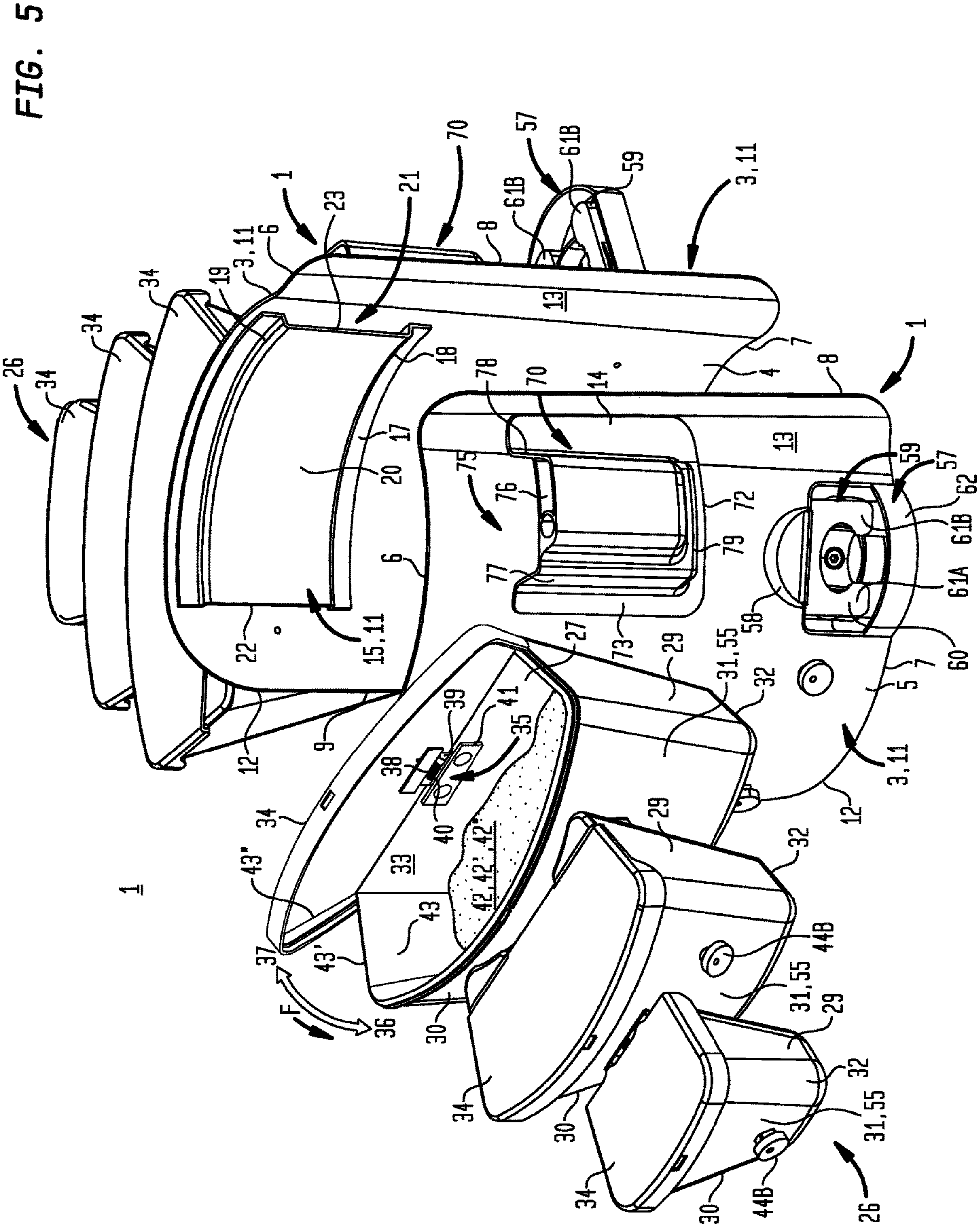
FIG. 5 is a first perspective view of a particular embodiment of a plurality of holders each having an open ended pocket and releasably coupled to a plurality of containers and a tool holder.
Figure 6:
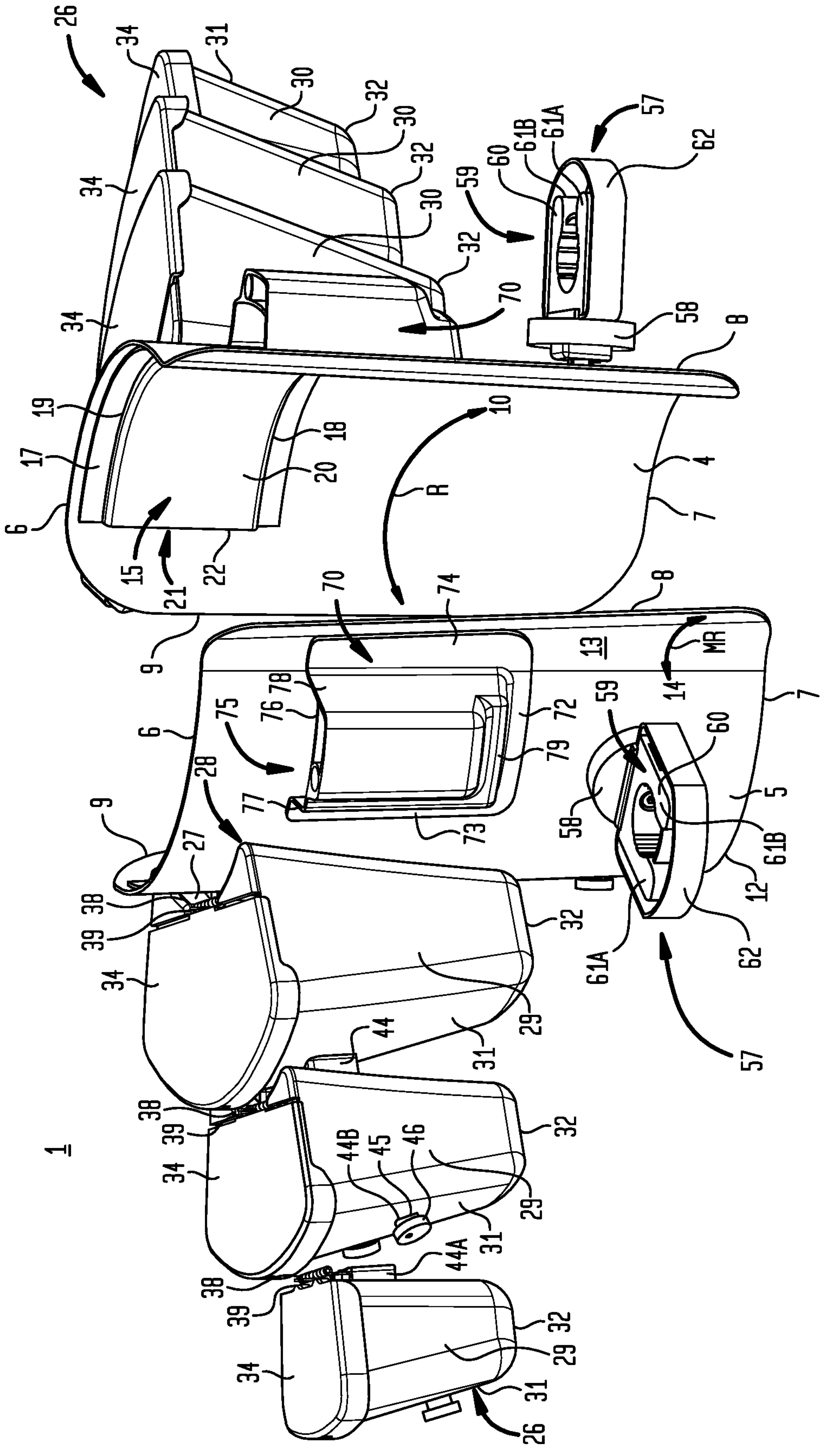
FIG. 6 is a second perspective view of a particular embodiment of a plurality of holders each having an open ended pocket and releasably coupled to a plurality of containers and a tool holder.
Figure 7:
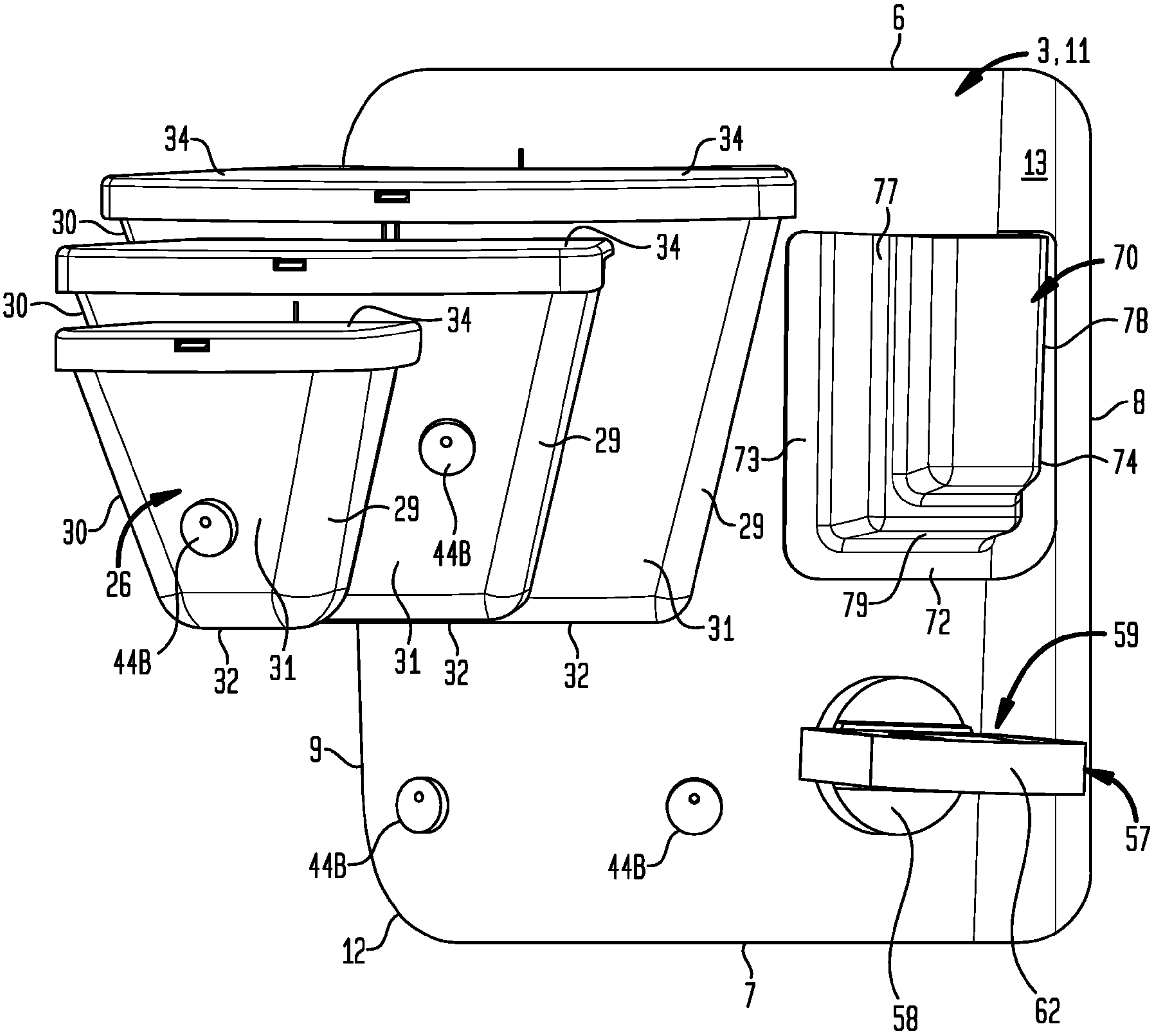
FIG. 7 is an exterior front elevation view of a particular embodiment of a holder having an open ended pocket and releasably coupled to a plurality of containers and a tool holder.
Figure 8:
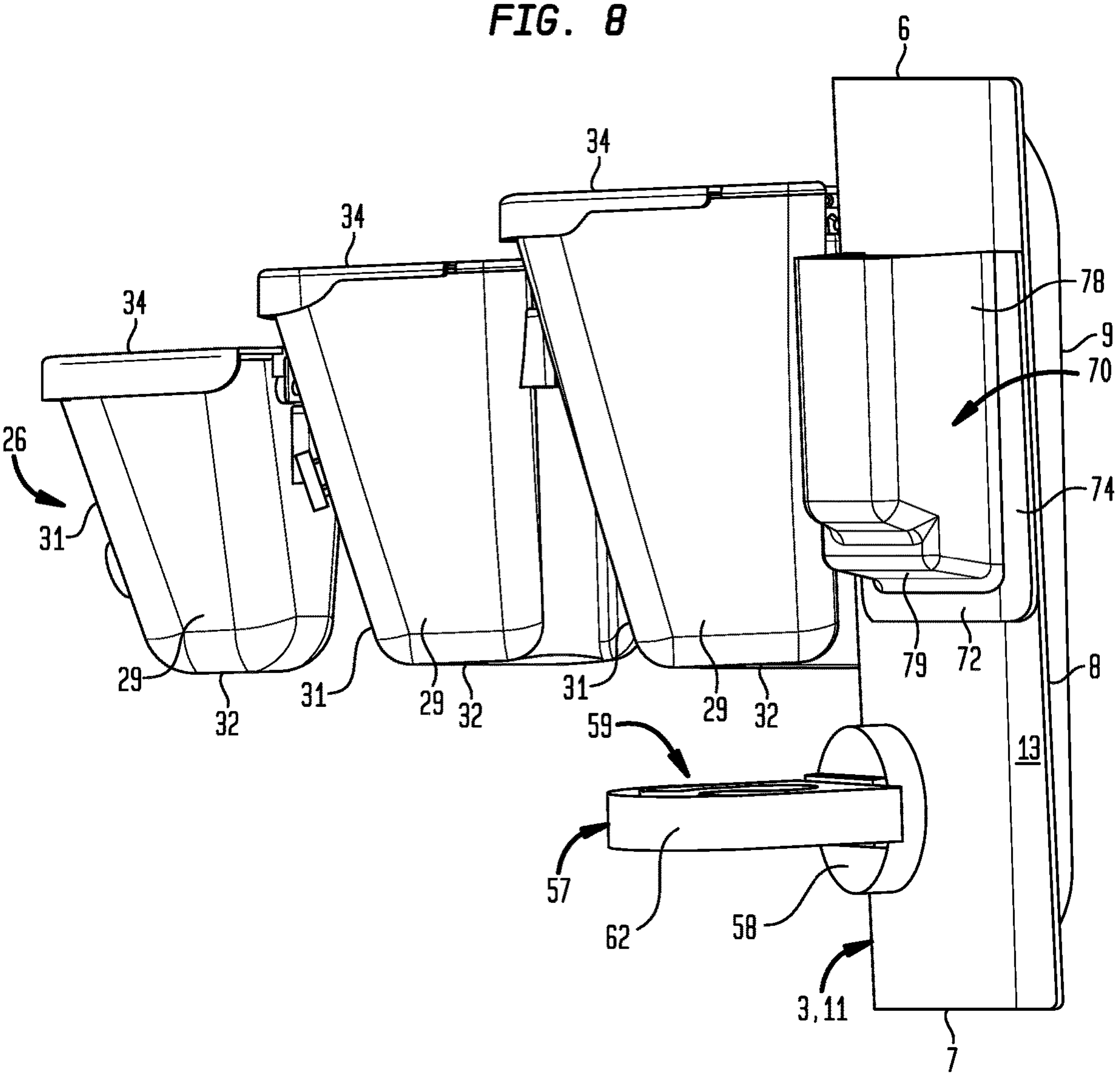
FIG. 8 is a side elevation view of a particular embodiment of a holder having an open ended pocket and releasably coupled to a plurality of containers and a tool holder.

Now with primary reference to FIG. 5, in particular embodiments, the container (26) can include a container interior surface (43) upwardly extending to an container rim (43') which configured to matingly sealingly engage the top cover (34) to enclose a container interior space (33). In particular embodiments, a seal element (43") can be joined to the container rim (43') or the container top cover (34) to enhance the seal between the container rim (43') engaged to the top cover (34). The seal (43") between the container rim (43') and the top cover (34) can be substantially leak proof to allow liquids (42") to be contained within the interior space (33) of the container (26) with the seal (43") preventing or substantially preventing leakage from the container (34) when the container (34) moves from a horizontal orientation toward a vertical orientation. The sealable container (34) may contain liquids (42") including as illustrative examples: paint, primer, cleaner, water, or other liquids, or combinations thereof.

Figure 11:
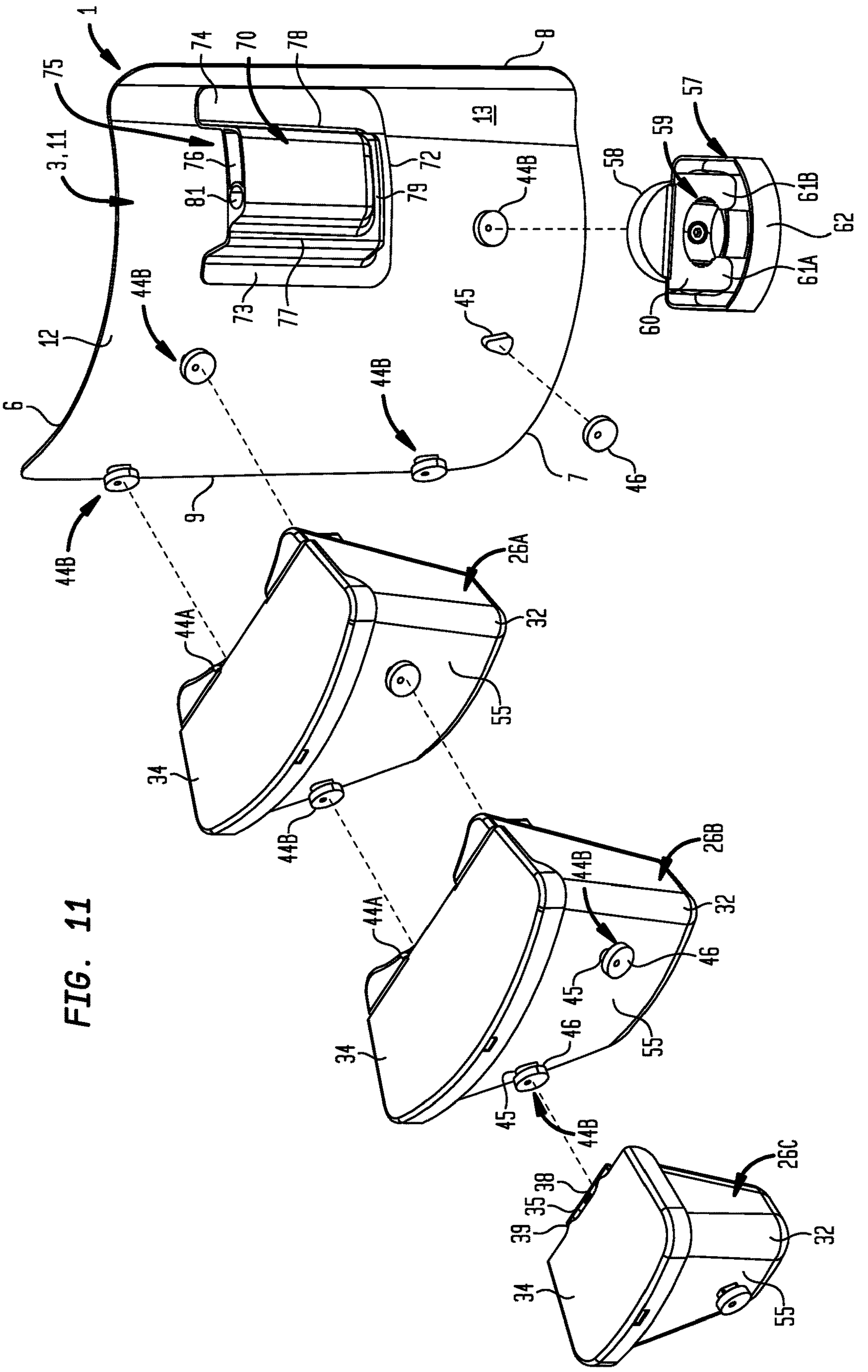
FIG. 11 is an exploded view of a particular embodiment of a holder having an open ended pocket and releasably coupled to a plurality of containers and a tool holder.
Figure 12:
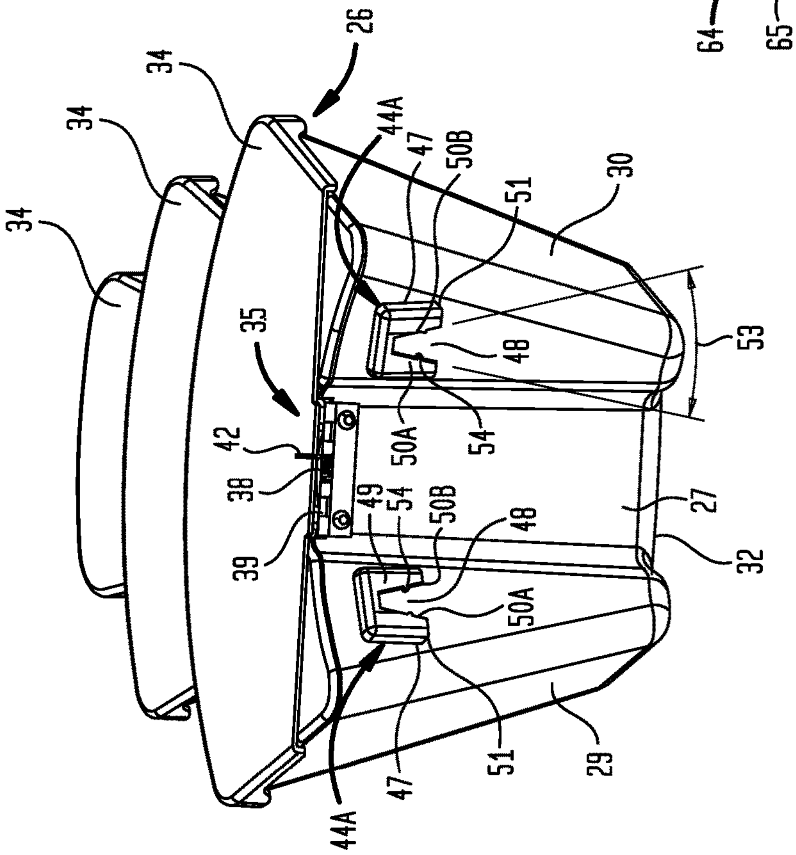
FIG. 12 is a back side elevation view of a particular embodiment of a plurality of containers which releasably couple to the exterior surface of the holder.

Now, with primary reference to FIGS. 5 through 12, in particular embodiments, the container (26) can be releasably affixed to the exterior face (5) of the arcuate member (3) through a mateable pair of fasteners (44), a first of the mateable pair of fasteners (44A) coupled to the arcuate back panel (27) of the container (26) and a second of the mateable pair fasteners (44B) coupled the exterior face (5) of the arcuate member (3) (as shown in the example of FIG. 6). The second of the mateable pair of fasteners (44B), can include a post (45) outwardly extending from the exterior face (5) of the arcuate member (3) terminating in post end (46) which outwardly radially extends from the post (45)(as shown in the example of FIG. 11). The first of the mateable pair of fasteners (44A) can comprise an open-end channel (47) joined to the arcuate back panel (27) of the container (26) to provide a post end receiving passage (48) (as shown in the example of FIG. 11). A open end slot (49) having opposing slot sides (50A)(50B) can be can be medially disposed in a channel end (51) of the open-end channel (47). The open end slot (49) can be configured to slidingly receive the post (45) and the post receiving passage (48) can be configured to correspondingly receive the post end (46), whereby, container (26) can be releasably coupled to the arcuate member (3). In particular embodiments, the post (45) can be have an orthogonal cross section which can be slidably received in the open-end slot (49) and which arrests rotation of the container (26) about the post (45) such as: a square or a rectangle, and in particular embodiments, the post (45) can include a radial post taper (52) (as shown in the example of FIG. 11) or the opposing slot sides (50A)(50B) can include a slot flare (53) (as shown in the example of FIG. 12), or combinations thereof, to facilitate receiving the post (45) into the open-end slot (49). In particular embodiments, one or both of the opposing slot sides (50A)(50B) can include a detent (54) over which the post (45) can be forcibly urged and can resist release of the post (45) received into the open-end slot (49).

Figure 9:
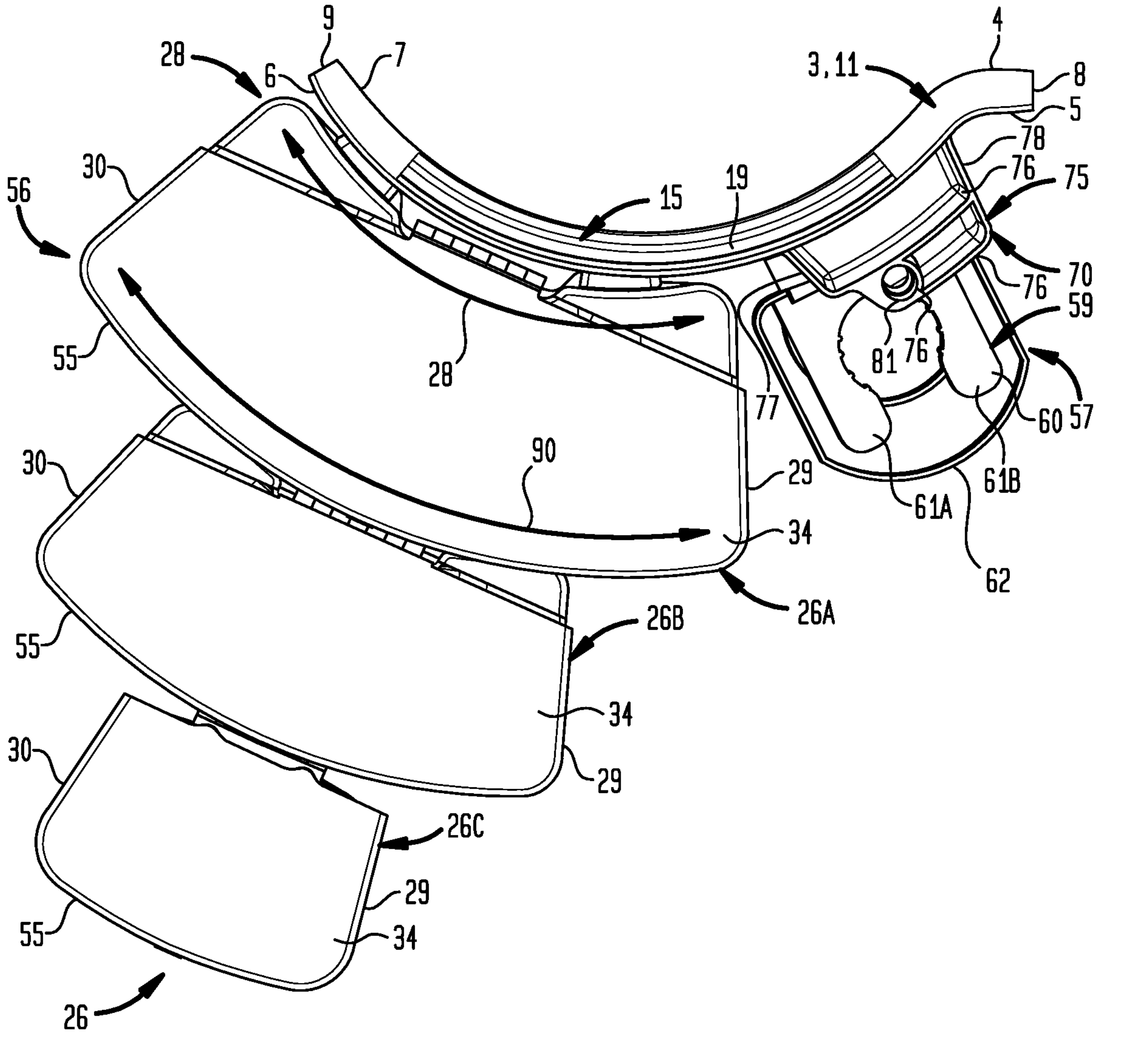
FIG. 9 is a top plan view of a particular embodiment of a holder having an open ended pocket and releasably coupled to a plurality of containers and a tool holder.
Figure 10:
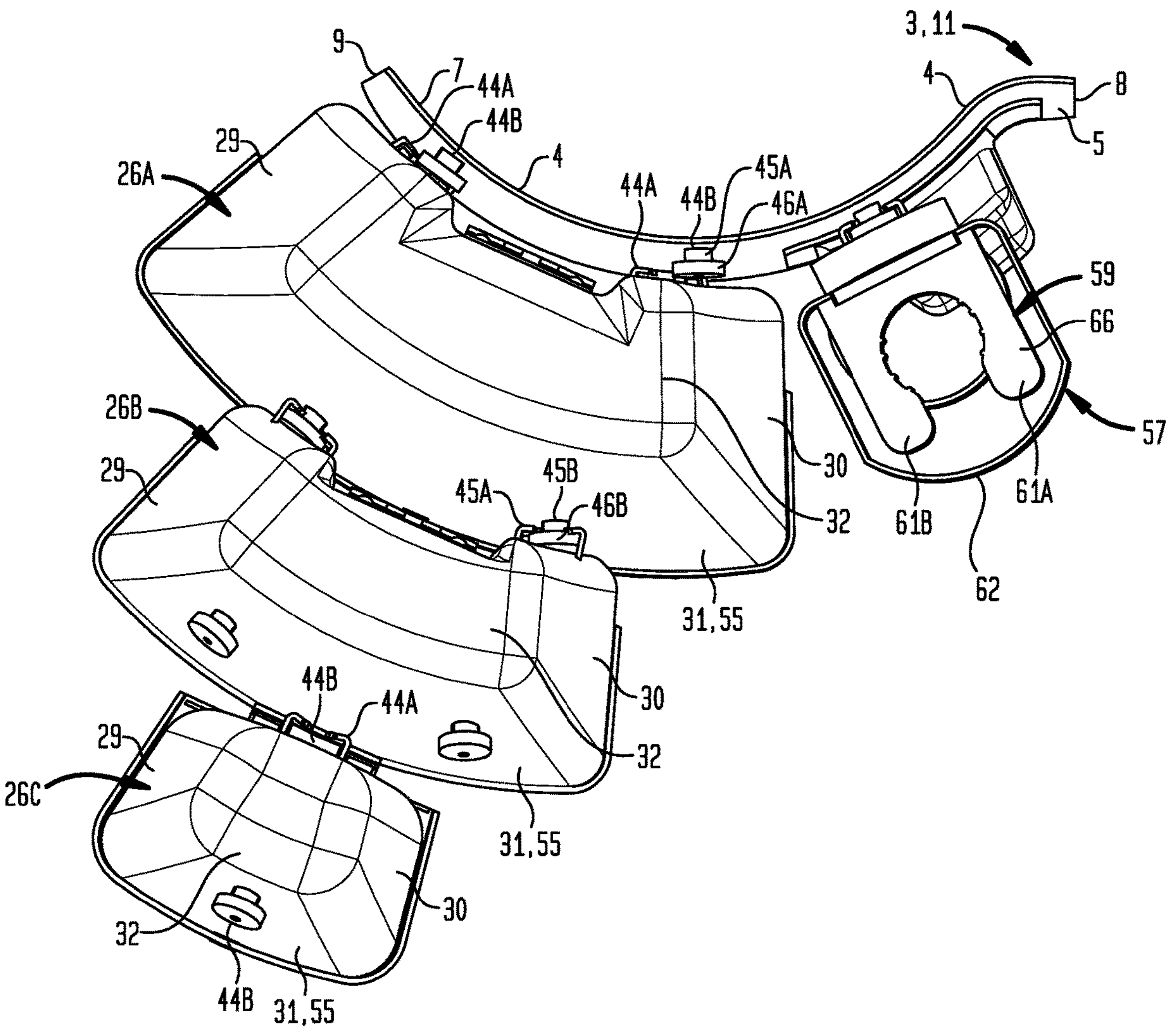
FIG. 10 is a bottom plan view of a particular embodiment of a holder having an open ended pocket and releasably coupled to a plurality of containers and a tool holder.

Now, with primary reference to FIG. 9, in particular embodiments, the container (26) can further include an arcuate front (55) having a front panel arc (56) of the same or similar radius to the arcuate back panel (27) of the container (26). A mateable pair of fasteners (44), as above described, can further include a second post (45B) having a second post end (46B) extending from the arcuate front panel (55) of a first container (26A) which can be correspondingly slidingly received in open-end slot (49) and post end receiving passage (48) of the open-end channel (47) disposed on the arcuate back panel (27) of a second container (26B) which allows a plurality of containers (26) to be interconnected and releasably affixed to the exterior face (5) of the arcuate member (3).

Again, with primary reference to FIG. 9, in particular embodiments, while the radius of the back panel arc (28) of the arcuate back panel (27) and radius of the front panel arc (56) of the arcuate front panel (55) can remain substantially the same, the dimensional relations of the arcuate back panel (27), arcuate front panel (55) and the opposite side panels (29)(30) and bottom panel (32) can define different sized containers (26) which can be interchangeably releasably interconnected and releasably affixed to the exterior face (5) of the arcuate member (3).

Now, with primary reference to FIGS. 5 through 14, particular embodiments can include a tool holder (57) having a tool holder base (58) rotatably mounted to the exterior face (5) of the arcuate member (3) and a tool retainer (59). In particular embodiments, the tool holder base (58) can include tool retainer (59) comprising an extending spring clip (60) having opposing retainer arms (61A)(61B) configured to receive and resiliently retain a tool (42), such as: a hammer, a screwdriver, a pliers, a wire cutter, a tape measure, a utility knife, a nail puller, or a speed square. Forceable urging of the tool (42) against the opposing retainer arms (61A)(61B) can cause the opposing retainer arms (61A)(61B) to deform or deflect outward and increase in width when inserting or removing the tool (42) between the opposing retainer arms (61A)(61B). In particular embodiments, the tool holder base (58) can include a tool retainer (59) comprising an extending loop (62) into which a tool (42) can be insertingly suspended.

Figure 13:
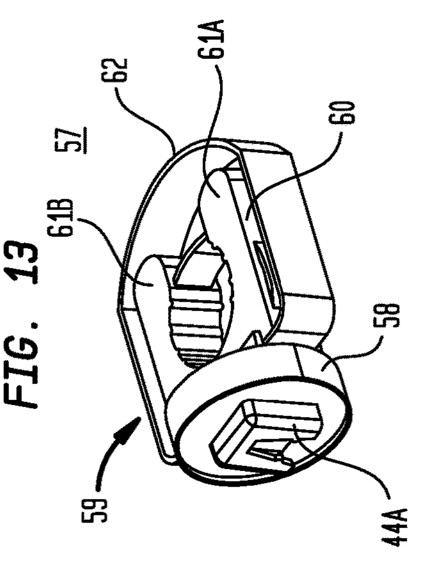
FIG. 13 is rear perspective view of a particular embodiment of a tool holder which can be releasably coupled to the exterior surface of the holder.
Figure 14:
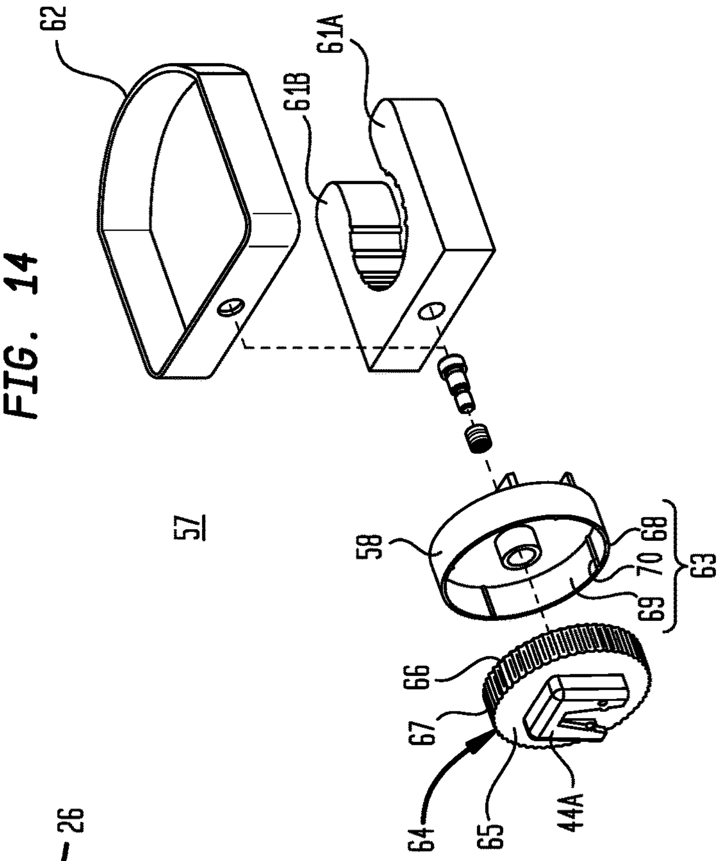
FIG. 14 is an exploded view of the particular embodiment of a tool holder shown in FIG. 13.

Now, with primary reference to FIGS. 13 through 14, the tool holder (57) can further include a ratchet assembly (63) operable to resist rotation of the tool holder base (58) to maintain the tool retainer (59) in a plurality of positions in relation to the arcuate member (3), whereby a tool (42) retained in the tool holder (57) can disposed in a plurality of longitudinal orientations which may depend on the position or activity of the wearer (W). As shown in the illustrative example of FIG. 14, the ratchet assembly (63) can include a ratchet member (64) having opposite ratchet member sides (65)(66) extending to a toothed ratchet member edge (67). The ratchet member (64) can be disposed in rotationally fixed relation to the arcuate member (3). In particular embodiments, the ratchet member (64) can be releasably affixed to the exterior face (5) of the arcuate member (3) through a mateable pair of fasteners (44) as above described with the post (45) and the open ended channel (47) configured to substantially preclude rotation of the ratchet member (64) in relation to the exterior face (5) of the arcuate member (3). The tool holder base (58) can be pivotally coupled to the ratchet member (64) to dispose a base sidewall (68) in adjacent relation about the toothed ratchet member edge (67). The base sidewall interior surface (69) can further include one or more base sidewall detents (70) sufficiently raised in relation to the base sidewall interior surface (69) to engage the toothed ratchet member edge (67). Upon rotation of the tool holder base (58), the base sidewall (68) can be sufficiently resilient to allow the one or more base sidewall detents (70) to incrementally move to positions between adjacent pairs of teeth (71A)(71B) disposed on the tooth ratchet member edge (67) which correspondingly arrest rotation of the tool holder base (58) until sufficient forcible urging upon the tool holder base (58) resiliently flexes the base sidewall (68) to allow movement of the one or more base sidewall detents (70) over the toothed ratchet member edge (67). The tool retainer (50) can be affixed to the tool holder base (58) to corresponding rotate with the tool holder base (58) to orient tools (42) retained by the tool retainer (50) to any of a plurality of positions in relation to the arcuate member (3).

Now, with primary reference to FIGS. 5 through 9, in particular embodiments, an open ended pocket (71) can be formed by joining a pocket bottom margin (72) and opposite pocket side margins (73)(74) to the arcuate member (3) to define a pocket interior compartment (75) adapted to hold one or more tools (42) such as a pliers, a screw driver, a wire stripper, a wire cutters, a measuring tape, a pliers, a wire cutter, a tape measure, a utility knife, a nail puller, a speed square, a pencil, a pen, a marker. The pocket interior compartment (75) can be divided into pocket interior sub-compartments (76) by compartment divider walls (77) interconnected with the pocket sides (77)(78) or pocket bottom (79). In particular embodiments, the pocket interior sub-compartments (76) can be adapted to releasably retain a particular tool (42), and as shown in the example of FIG. 1, the pocket interior sub-compartment (76) can be configured to releasably seal with end of a pen or a marker (80) as a substitute for a pen or marker cap (81), thereby affording the advantage of allowing removal of the pen or marker (80) without further removal of the pen or marker cap and allowing insertion of the pen or marker into the pocket interior sub-compartment (76) to cap the pen or marker (80).

Figure 15:
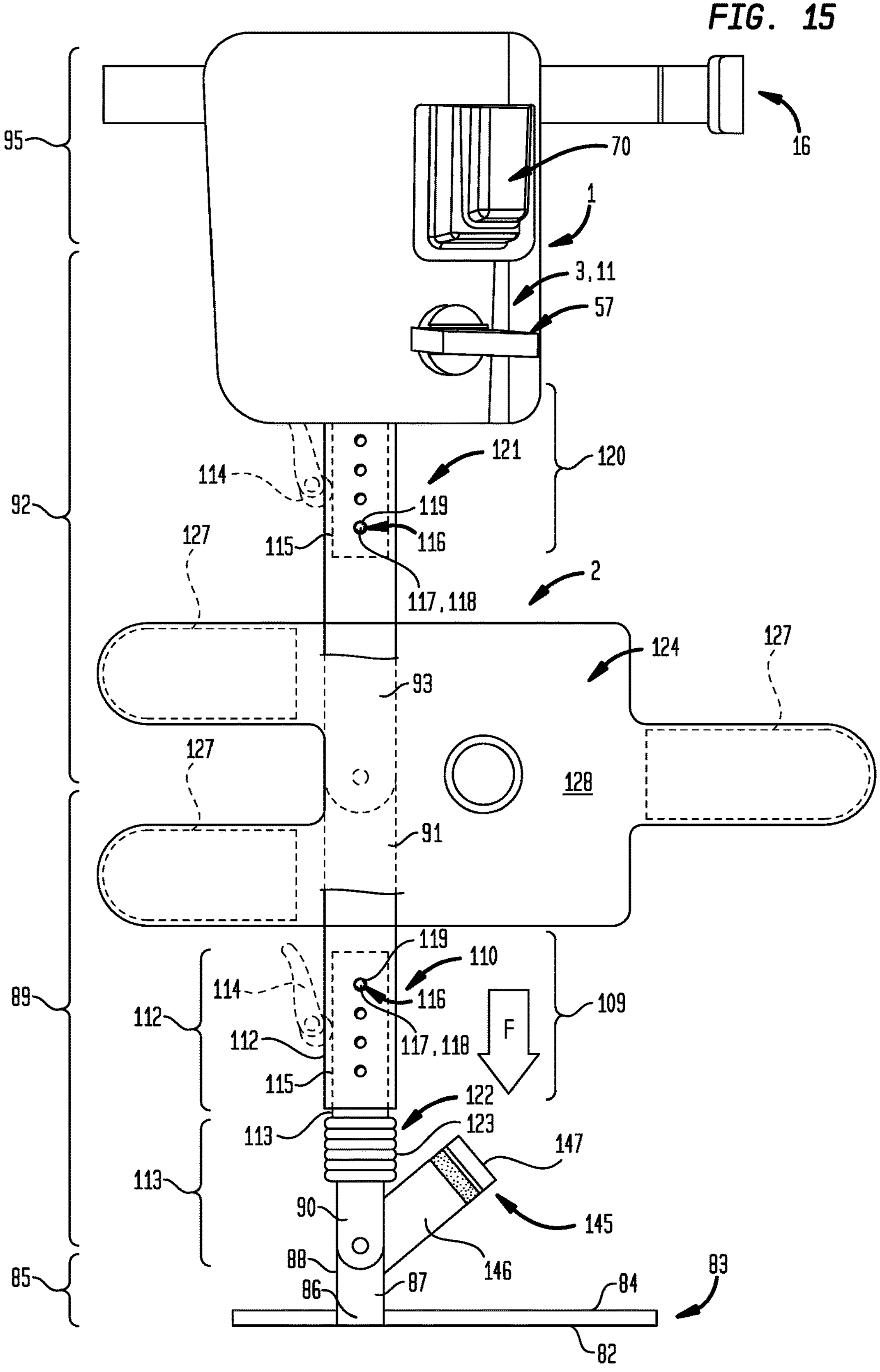
FIG. 15 is an outer side elevation view of a particular embodiment of the holder support joined to the holder.
Figure 16:
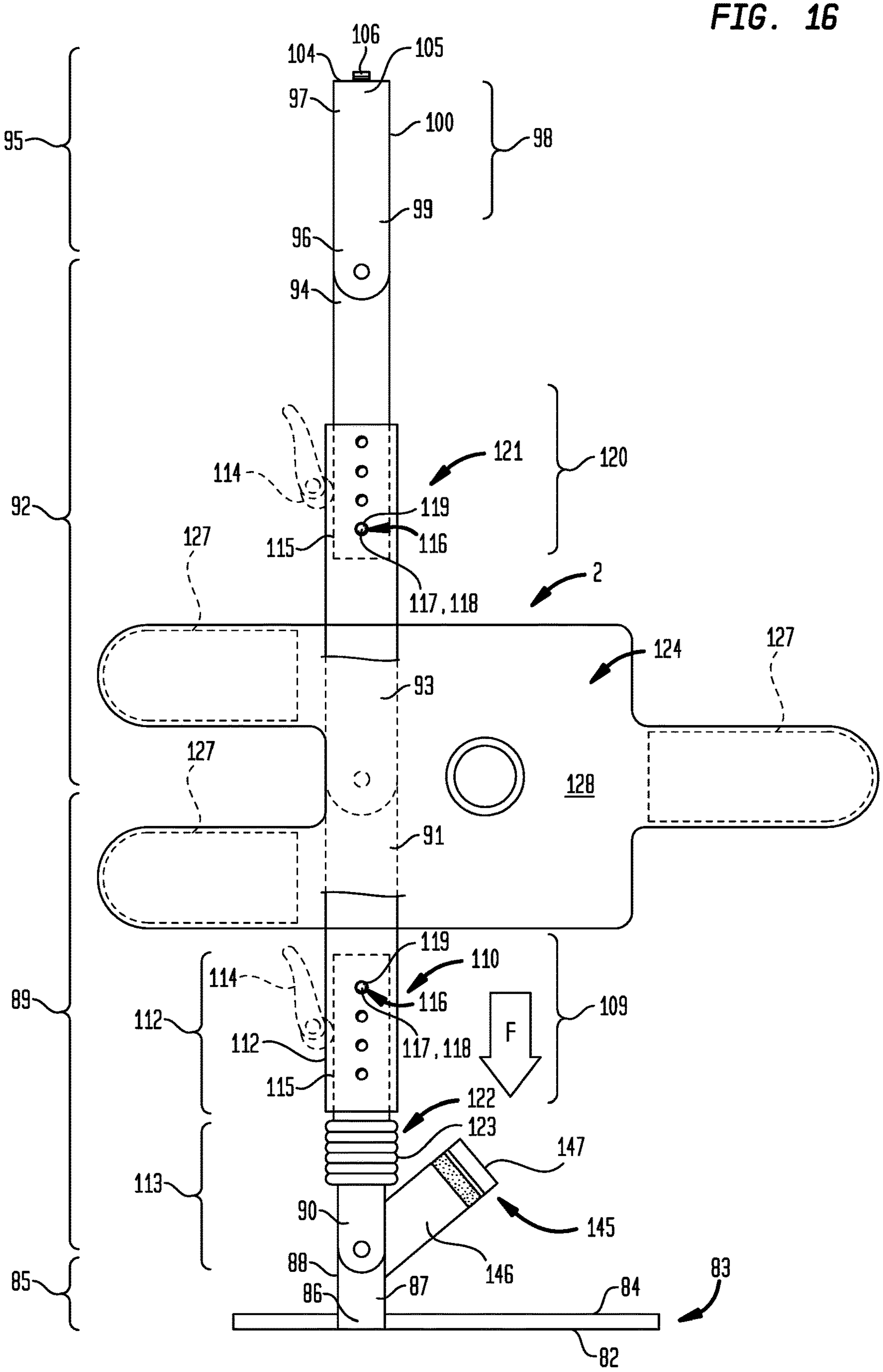
FIG. 16 is an outer side elevation view of a particular embodiment of the holder support.
Figure 17A:
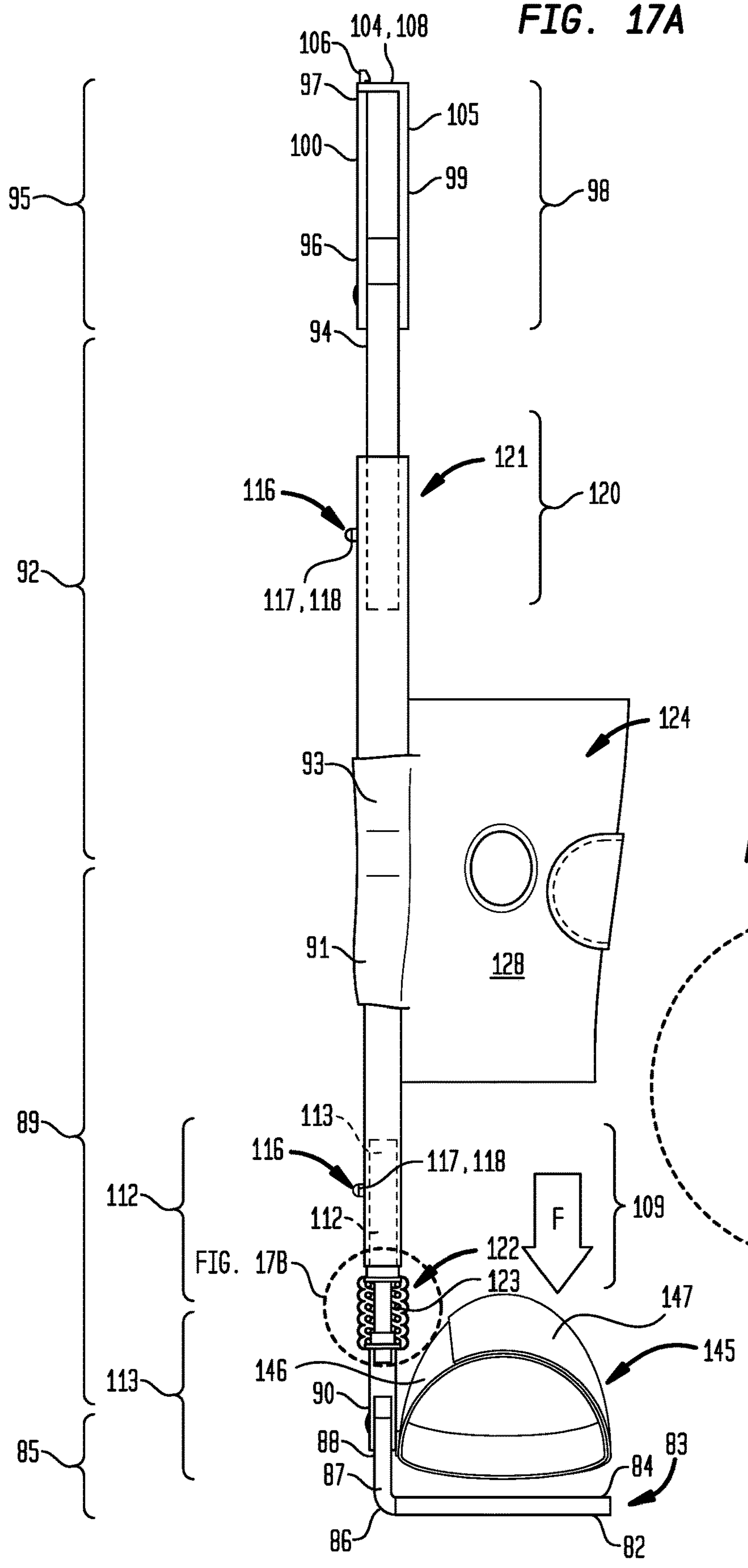
FIG. 17A is a front elevation view of a particular embodiment of the holder support.
Figure 17B:
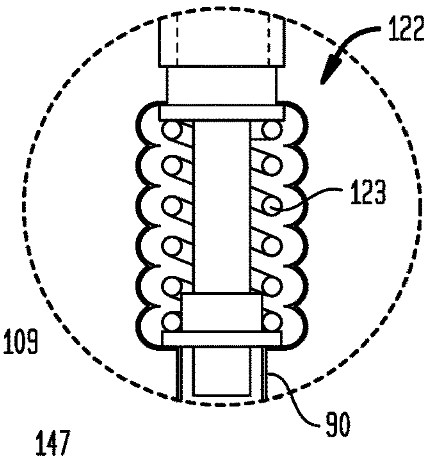
FIG. 17B is an enlarged portion of FIG. 17A depicting a cross section view of the energy absorbing member.

Now, with primary reference to FIGS. 15 through 17, embodiments can further include a holder support (2) adapted to couple the holder (1) to transfer a holder weight normally applied to the waist (WST) of the wearer (W) to a ground engaging surface (82) to remove weight bearing stress from the waist (WST) of the wearer (W). The holder support (2) can comprise or consist of an outsole (83) having a ground (G) engaging surface (82) opposite a foot engaging surface (84) adapted to engage the foot (F) or the shoe (S) of a wearer (W). A stirrup (85) including a stirrup base (86) can be coupled to the outsole (82) with a stirrup side piece (87) upwardly extending to terminate in a stirrup end (88) proximate the ankle (A) of the wearer (W). A first support member (89) having a length disposed between a first support member first end (90) and a first support member second end (91) can be pivotally coupled by the first support member first end (90) to the stirrup end (88). The first support member (89) can be configured to extend upwardly to positions adjacent an outer side of a calf (C) of the wearer (W). A second support member (92) having a length disposed between a second support member first end (93) and a second support member second end (94) can have the second support member first end (93) pivotally coupled to the first support member second end (91) at a position adjacent an outer side of a knee (K) of the wearer (W). A third support member (95) having a length disposed between a third support member first end (96) and a third support member second end (97) can have a third support member first end (96) pivotally coupled to the second support member second end (94) adjacent an outer side of a hip (H) of the wearer (W). The third support member second end (97) can be removably or non-removably coupled to the corresponding arcuate member (3) of the holder (1).

Figure 3:
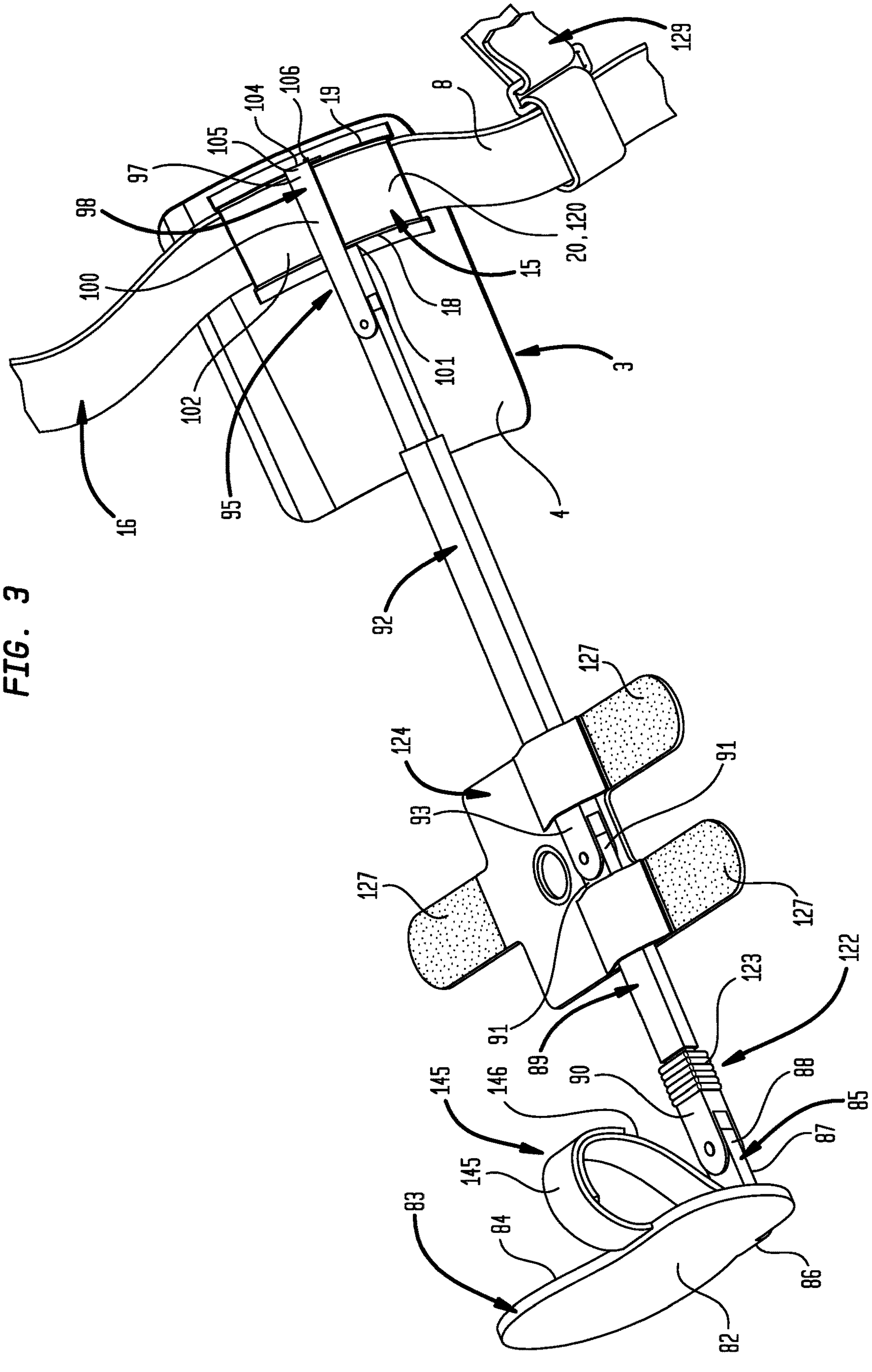
FIG. 3 is an inner side elevation view of a particular embodiment of the holder support joined to the holder.
Figure 4:
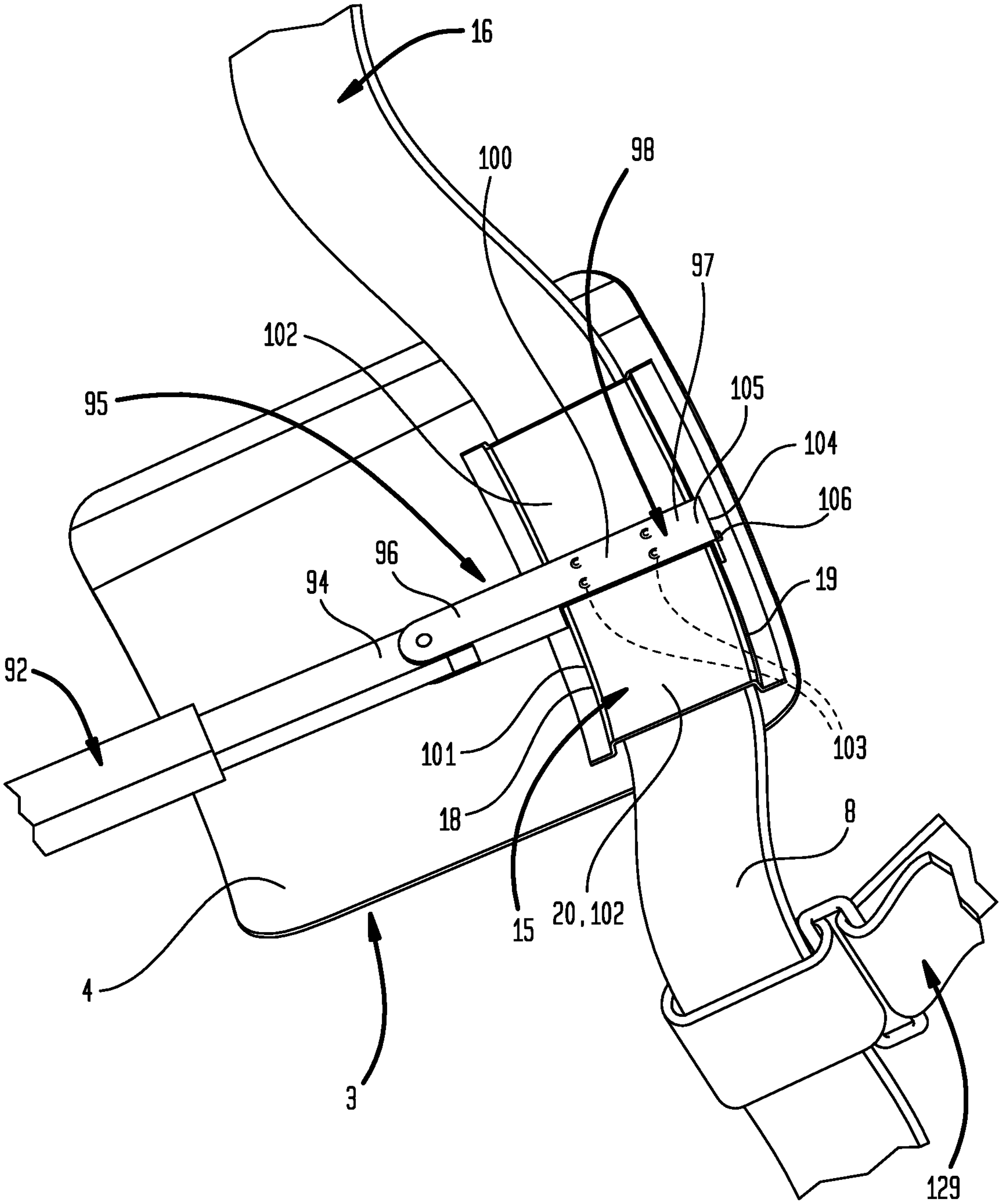
FIG. 4 is an enlarged portion of inner side elevation view of a particular embodiment of the holder support joined to the holder shown in FIG. 3.

As shown in the illustrative example of FIGS. 3 through 4 and 15 through, 17 the third support member second end (97) can include a bifurcate mount (98) having a first fork (99) and a second fork (100). The belt receiving element (15) can include a first fork receiving slot (101) disposed in the lower one of the pair of channel legs (19). The first fork (99) of the bifurcate mount (98) can be inserted into the first fork receiving slot (101) to dispose the second fork (100) of the bifurcate mount (98) adjacent the belt receiving element external surface (102). The bifurcate mount (98) can be disposed in fixed spatial relation to the belt receiving element (15) by mechanical fasteners (103) (as shown in the example of FIG. 3). In particular embodiments, the bifurcate mount (98) can be releasably slidably mounted to the belt receiving element (15) and a latch element (104) can be coupled to a second fork terminal end (105) of the second fork (100). The latch element (104) can be configured to mateably releasably latch to a latch surface (106) coupled to a first fork terminal end (107) or the belt receiving element (15). In particular embodiments, the latch element (104) can comprise a resilient latch flange (108) outwardly extending toward the latch surface (106) in generally orthogonal relation to the first fork terminal end (107). The first and second fork terminal ends (105)(107) of the bifurcate mount (98) be disposed a sufficient distance apart to allow latch element (104) to pass over the belt receiving element external surface (102) and the first and second forks (99)(100) can resiliently flex under forcible urging to allow the latch element (104) to resiliently latchingly engage the latch surface (106) to secure the bifurcate mount (98) to the belt receiving element (15). The latch element (104) can be resiliently flexed away from the latch surface (106) and the first fork (99) and the second fork (100) can return to the unflexed condition to allow the bifurcate mount (98) to be removed from the belt receiving element (15).

Now, with primary reference to FIGS. 15 through 17, embodiments can, but need not necessarily, include a first height adjustment assembly (109) medially disposed in the first support member (89) permitting relative motion between the first support member first and second ends (90)(91) and a first motion arrest assembly (110) which arrests relative motion between the first support member first and second ends (90)(91). The first motion arrest assembly (110) being shiftable into and out of a locked configuration (111) to substantially stop relative motion between the first support member first and second ends (90)(91). The first height adjustment assembly (109) can comprise first and second telescoping sections (112)(113) of the first support member (89) which allow relative motion between the first support member first and second ends (90)(91). The first motion arrest assembly (110) can be shifted into and out of a locked configuration (111) to allow incremental telescoping height adjustment of the first and second telescoping sections (112)(113). In particular embodiments, the first motion arrest assembly (109) can comprise a camming member (114) coupled to the first telescoping section (112) to engage a camming surface (115) on the second telescoping section (113) to afford the locked configuration (111). As a second illustrative example, the first motion arrest assembly (110) can comprise a detentable bullet catch (116) including a spring loaded bullet head (117) disposed on the inner first telescoping section (112) and biased toward an extended condition (118), whereby alignment of the bullet head (117) with at least one aperture (119) in the outer second telescoping section (113) disposes of the bullet head (117) in the aperture (119) to afford the locked configuration (111).

Again, with primary reference to FIGS. 15 through 17, embodiments can, but need not necessarily, include a second height adjustment assembly (120) medially disposed in said second support member (92) permitting relative motion between second support member first and second ends (93)(94) and a second motion arrest assembly (121) which arrests relative motion between said second support member first and second ends (93)(94), as above described. The second motion arrest assembly (121) being shiftable into and out of a locked configuration (111) to substantially stop relative motion between said second support member first and second ends (93)(94).

Now, with primary reference to FIGS. 15 through 17, embodiments can, but need not necessarily, include an energy absorbing member (122) disposed between the first support member first end (90) and the stirrup end (88), the energy absorbing member (122) adapted to absorb forces (F) between the stirrup (85) and the first support member (89). In particular embodiments, the stirrup end (88) telescopingly engages the first support member (89). The forces of relative telescoping motion between the stirrup (85) and the first support member (89) can be absorbed by a resilient member (123) responsive to relative motion between the stirrup (85) and the first support member (89). In particular embodiments, the resilient member (123) can be one or a combination of a coil spring, a closed cell foam, pneumatic cell, hydraulic cell, a corrugated spring sleeve.

Now, with primary reference to FIGS. 1 through 2 and 15 through 17, embodiments can, but need not necessarily, include a cuff (124) which can be adjustably positioned along the a holder support (2) to engage the second support member first end (93) pivotally coupled to the first support member second end (91) at a position adjacent an outer side of the knee (K) of the wearer (W). The cuff (124) can include releasably mateable cuff portions (125)(126) which releasably secure the cuff (124) about the knee (K) of the wearer (W). In particular embodiments, the mateable portions (125)(126) of the cuff (124) can comprise releasably mateable hook and loop fasteners (127)(128).

Again, with primary reference to FIGS. 1 through 2 and 15 through 17, embodiments can, but need not necessarily, include a stirrup strap (145) coupled to the stirrup (85)) or the outsole (83). The stirrup strap (145) can have one or more portions that mateably engage about one or more of the ankle (A), foot (F) or shoe (S) of the wearer (W) to releasably engage the foot (F) or shoe (S) with the outsole (83). In the illustrative example, the stirrup strap (145) wraps about the ankle (A) of the wearer (W) with stirrup strap first and second portions (146)(147) adjustably mateable to allow releasable engagement of the foot (F) or the shoe (S) with the outsole (83).

Figure 2:
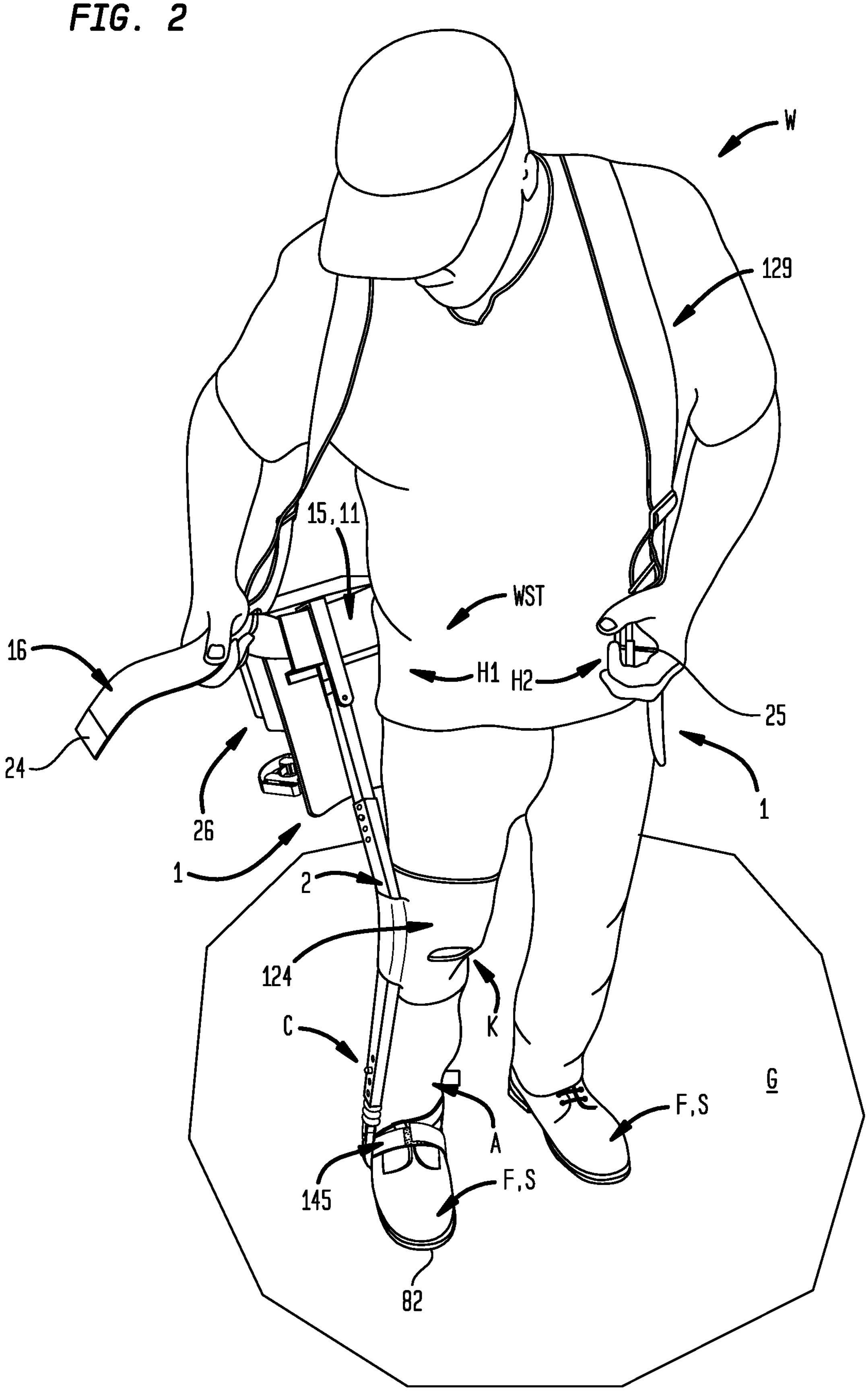
FIG. 2 is an illustration of a particular embodiment of a holder and holder support and method of disposing the holder support on a leg of a wearer and securing the holder proximate the waist of a wearer.

Now, with primary reference to FIGS. 1 through 2, in particular embodiments, the holder support (2) can include a holder suspender (129) including a first shoulder member (130) having a first shoulder member medial portion (131) disposed between a first shoulder member first end (132) and a first shoulder member second end (133), the first shoulder member (130) adapted to be supported on a first shoulder area (Si) of the wearer (W) and a second shoulder member (134) having a second shoulder member medial portion (135) disposed between a second shoulder member first end (136) and a second shoulder member second end (137), the second shoulder member (134) adapted to be supported on a second shoulder area of the wearer (W). The first and second shoulder member first and second ends (136) (137) can be coupled to the belt (16) to support the holder (1).

Figure 18:
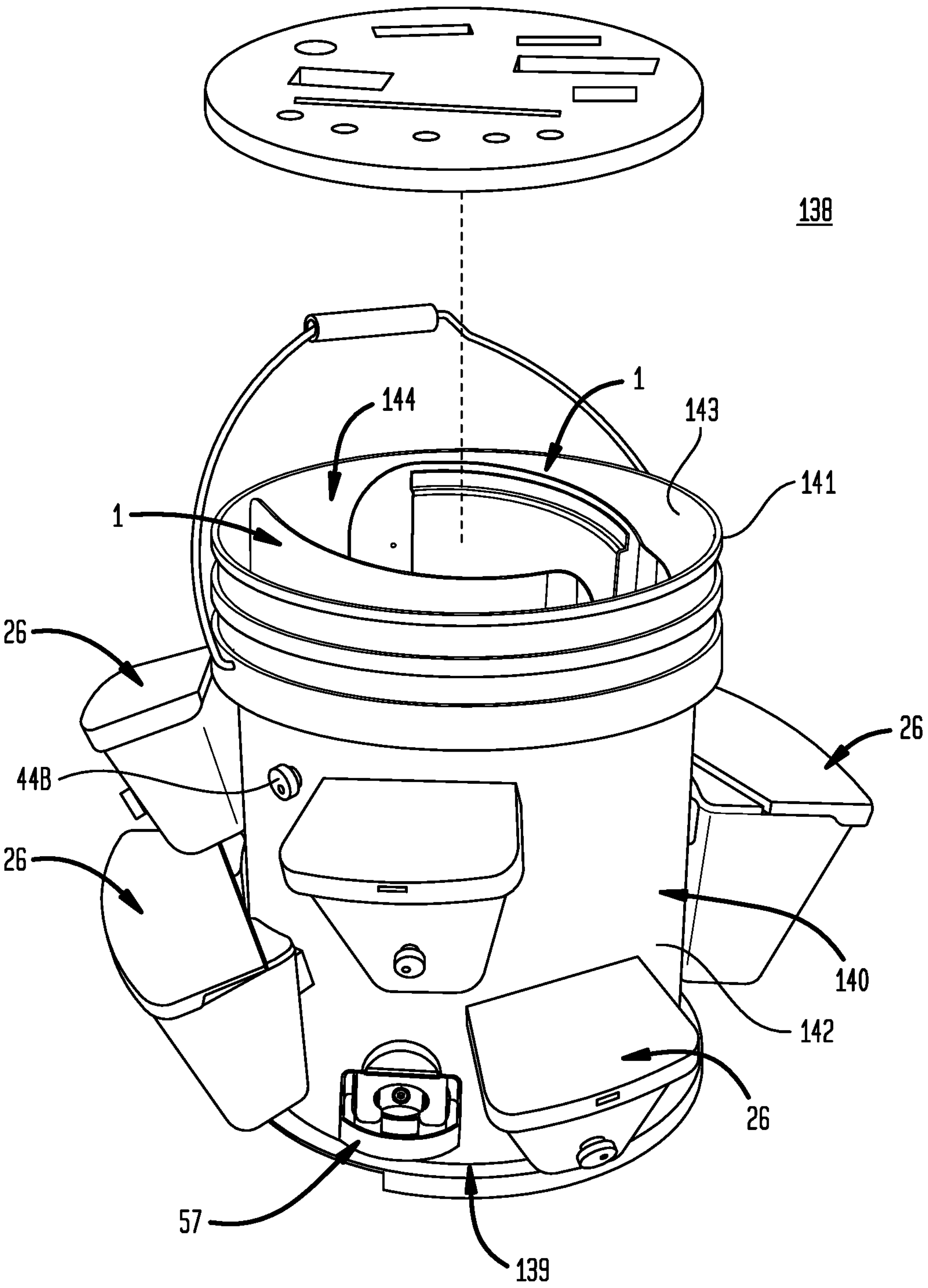
FIG. 18 is perspective view of a storage receptable configured to store embodiments of the holder and holder support and containers and tool holders which releasably couple to the holder.

Now, with primary reference to FIG. 18, embodiments can further include a storage receptacle (138) having a receptacle bottom (139) joined to a receptacle sidewall (140) upwardly extending to a receptacle rim (141). The receptacle sidewall (140) of the storage receptacle (138) can have a receptacle outer surface (142) opposite a receptacle inner surface (143) defining a receptacle interior space (144) adapted to stow the holder (1) and holder support (2). The receptacle outer surface (142) can have a radius the same or similar the arcuate member arc (10) of the exterior face (5) of the arcuate member (3). The receptacle outer surface (142) can further include one or more of the second of the mateable pair of fasteners (44B) to which the first of the mateable pair fasteners (44A) can couple to releasably affix one or more container (26) to the receptacle outer surface (142).

As can be easily understood from the foregoing, the basic concepts of the present invention may be embodied in a variety of ways. The invention involves numerous and varied embodiments of a stackable jewelry system and methods for making and using such a stackable jewelry system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "container" should be understood to encompass disclosure of the act of "containing"—whether explicitly discussed or not—and, conversely, were there effectively disclosure of the act of "containing", such a disclosure should be understood to encompass disclosure of a "container" and even a "means for containing". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the holders and holder supports herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A holder, comprising:

an arcuate member including a substantially rigid sheet material having an arcuate member interior face opposite an arcuate member exterior face bounded by an upper edge, a lower edge, a first side edge, and a second side edge, said arcuate member interior face defining an arcuate member arc between said first and second side edges, wherein said arcuate member has first side edge margin between said lower edge and said upper edge, said first side edge margin has a first side edge margin arc which extends in opposite direction of said arcuate member arc of said arcuate member interior face; and a belt receiving element coupled to said arcuate member interior face, said belt receiving element adapted to receive a belt to support said holder about a waist of a wearer.

2. The holder of claim 1, wherein said first side margin arc has a radius occurring in the range of about one-quarter inch to about 1 inch.

3. A holder, comprising:

an arcuate member including a substantially rigid sheet material having an arcuate member interior face opposite an arcuate member exterior face bounded by an upper edge, a lower edge, a first side edge, and a second side edge, said arcuate member interior face defining an arcuate member arc between said first and second side edges;

a belt receiving element disposed on said arcuate member interior face of said arcuate member, said belt receiving element adapted to receive a belt to support said holder about a waist of a wearer; and a first one of a mateable pair of fasteners coupled to said arcuate member exterior face of said arcuate member, said first one of said mateable pair of fasteners configured to couple to a second one of said pair of mateble fasteners coupled to a first container or a tool holder, said first one of said mateable pair of fasteners and said second one of said mateable pair of fasteners configured to releasably mateably fasten to releasably affix said first container or said tool holder to said exterior face of said arcuate member.

4. The holder of claim 3, wherein said first container including an arcuate back panel defining a back panel arc to dispose said arcuate back panel in generally parallel relation to said exterior arcuate face of said arcuate member upon affixing said first container to said exterior face of said arcuate member.

5. The holder of claim 3, wherein said first container including an arcuate front panel, wherein a first one of a second mateable pair of fasteners affixed to said arcuate front panel of said first container, said second one of said second mateable pair of fasteners coupled to an arcuate back panel of a second container, said second mateable pair of fasters releasably fasten to releasably affix said first container to said second container.

6. The holder of claim 3, wherein said first one of said mateable pair of fasteners includes an open-end slot medially disposed in an open-end channel joined to the arcuate back panel of said first container, and wherein said second one of said mateable pair of fasteners includes a post outwardly extending from the exterior face of said arcuate member, said post terminating in a outwardly radially extending post end, said post and said open-end slot configured to slidingly engage and said open-end channel defining a post receiving passage to insertingly receive said post end.

7. The holder of claim 6, further comprising a detent coupled at least on of said opposing slot sides which resists release of said post received into said open-end slot.

8. The holder of claim 6, wherein said post has an orthogonal cross section configured to arrests rotation of said post slidably inserted in said open-end slot.

9. The holder of claim 5, further comprising a top cover having a top cover attachment portion rotatably coupling said top cover to said arcuate back panel allowing said top cover to move between an open condition and a closed condition, said top cover attachment portion including a torsion spring biasedly disposed about a hinge shaft, said torsion spring having first and second torsion spring ends biasing against said arcuate back plate and said top cover respectively providing torsion force to urge said top cover toward said closed condition.

10. A holder, comprising:

an arcuate member including a substantially rigid sheet material having an arcuate member interior face opposite an arcuate member exterior face bounded by an upper edge, a lower edge, a first side edge, and a second side edge, said arcuate member interior face defining an arcuate member arc between said first and second side edges;

a belt receiving element disposed on said arcuate member interior face of said arcuate member, said belt receiving element adapted to receive a belt to support said holder about a waist of a wearer;

a first shoulder member having a first shoulder member medial portion disposed between a first shoulder member first end and a first shoulder member second end, said first shoulder member adapted to be supported on a first shoulder area of a user; and a second shoulder member having a second shoulder member medial portion disposed between a second shoulder member first end and a second shoulder member second end, said second shoulder support adapted to be supported on a second shoulder area of said user, said first and second shoulder member first and second ends coupled to said belt to support said holder.

11. The holder of claim 1, wherein said arcuate member arc has a radius occurring in the range of about 4 inches to about 6 inches.

12. The holder of claim 1, wherein said arcuate member has a generally rectangular configuration.

13. The holder of claim 1, wherein said rigid sheet material has a thickness occurring in the range of about one-eighth inch to about one quarter inch.

* * * * *